United States Patent [19]

Preston

[11] Patent Number: 5,118,454

[45] Date of Patent: Jun. 2, 1992

[54] METHOD FOR REPAIRING VOIDS IN VINYL SKIN COVERED URETHANE FOAM PRODUCTS

[75] Inventor: Frank J. Preston, Hampton, N.H.

[73] Assignee: Davidson Textron Inc., Dover, N.H.

[21] Appl. No.: 694,508

[22] Filed: May 2, 1991

[51] Int. Cl.⁵ .................... B28B 1/48; B28B 11/00; B32B 35/00

[52] U.S. Cl. .................... 264/36; 29/402.18; 156/94; 156/98; 264/35; 264/46.6; 264/139; 264/154; 264/155; 264/162; 264/263; 264/266; 264/267; 425/13; 427/140

[58] Field of Search .................... 264/30–36, 264/45.1, 46.4, 46.6, 46.9, 138, 139, 154–156, 263, 266, 267, 269, 162; 156/94, 98; 427/140; 52/514, 743; 425/12, 11, 13; 29/402.03–402.06, 402.09, 402.11, 402.18, 402.01

[56] References Cited

U.S. PATENT DOCUMENTS

| | | | |
|---|---|---|---|
| 2,320,425 | 6/1943 | Glaes et al. | 264/36 |
| 3,310,613 | 3/1967 | Lundberg | 264/36 |
| 3,804,685 | 4/1974 | Jacoby et al. | 264/36 X |
| 4,067,759 | 1/1978 | Vrolyk et al. | 156/94 |
| 4,329,132 | 5/1982 | Melvold et al. | 264/36 X |
| 4,390,333 | 6/1983 | Dubois | 264/36 X |
| 4,409,270 | 10/1983 | Faber et al. | 264/36 X |
| 4,510,001 | 4/1985 | Speer | 264/36 X |
| 4,519,856 | 5/1985 | Lazzara | 156/94 X |
| 4,659,525 | 4/1987 | Speer | 264/36 |
| 4,855,173 | 8/1989 | Dore | 264/36 X |
| 4,930,281 | 6/1990 | Martin et al. | 264/36 X |

FOREIGN PATENT DOCUMENTS

| | | | |
|---|---|---|---|
| 3443074 | 5/1986 | Fed. Rep. of Germany | 427/140 |
| 35024 | 3/1977 | Japan | 427/140 |
| 151319 | 9/1982 | Japan | 264/36 |
| 124624 | 7/1983 | Japan | 264/36 |
| 138621 | 8/1983 | Japan | 264/36 |
| 149437 | 8/1985 | Japan | 156/94 |
| 2232421 | 10/1987 | Japan | 264/36 |
| 3154332 | 6/1988 | Japan | 264/36 |
| 1386691 | 3/1975 | United Kingdom | 264/36 |

Primary Examiner—Karen Aftergut
Attorney, Agent, or Firm—Reising, Ethington, Barnard, Perry & Milton

[57] ABSTRACT

A method for repairing voids in a finished urethane foam product having a typical backing insert or retainer wall, the method including the steps of forming a hole through the retainer wall adjacent the void; inserting a small elastomeric sheath through the hole into the void; injecting a urethane or silicone elastomer into the sheath to fill same to conform to the void; and sealing off the hole with a suitable plug which may be sanded flush with the retainer wall outer surface.

4 Claims, 1 Drawing Sheet

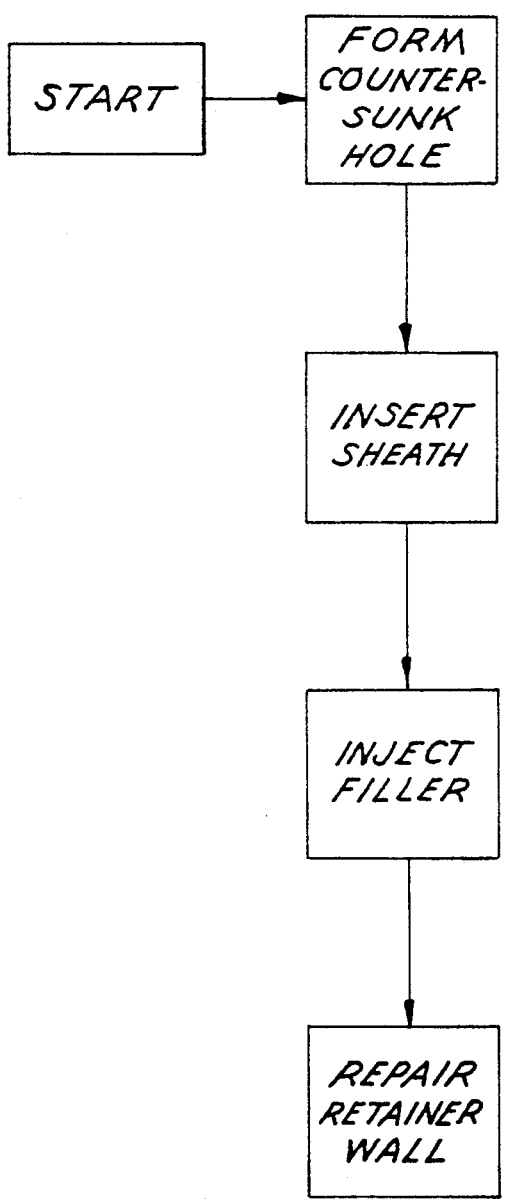
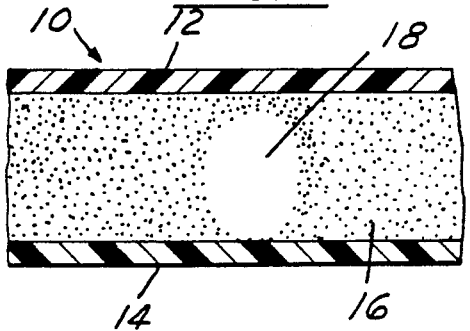
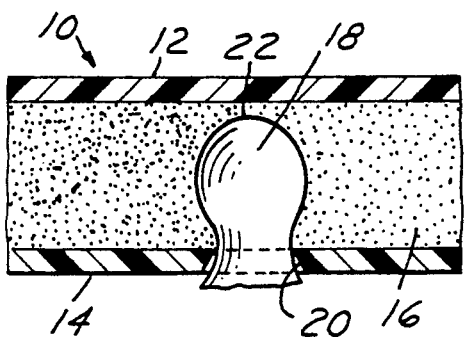
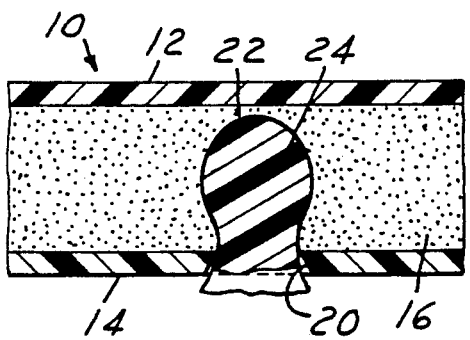
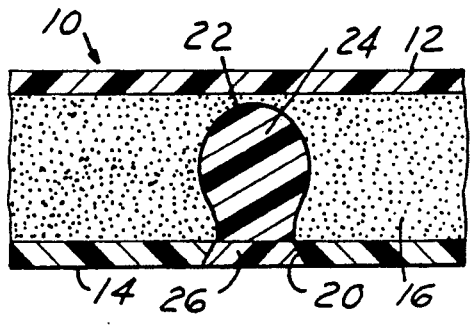

METHOD FOR REPAIRING VOIDS IN VINYL SKIN COVERED URETHANE FOAM PRODUCTS

TECHNICAL FIELD

This invention relates generally to urethane foam products and, more particularly, to a method for repairing voids in such products.

BACKGROUND ART

Heretofore, various methods have been used to repair damaged or defective urethane foam products, such as vinyl skin covered automobile armrests or instrument panels. For example, it is known to inject a plasticizer into voids formed beneath the outer skin. However, the plasticizer tends to "wick" from the void to produce a lake-like appearance in the skin.

Speer Pat. No. 4,659,525 discloses a method consisting of the steps of trimming away externally damaged material, filling the trimmed area with an air drying repair compound, allowing the air drying to occur, covering the repair compound with a heat curable repair compound, which may include appropriate coloring pigment, placing a smooth or suitably textured grained release paper over the repair area, applying heat to effect the curing, allowing time to cool, and removing the smooth or grained release paper.

Dubois Pat. No. 4,390,333 discloses an apparatus for use in closing a hole in the walls of storage tanks, including an expandable bladder mounted at the end of a rigid tube which, in turn, is connected to a nozzle connected by flexible tubes to a foam generating kit. The bladder is manoeuvered by the rigid tube partially through the hole and filled with foam material to expand as required to plug the hole in the wall of the storage tank.

Melvold et al Pat. No. 4,329,132 is another hole plugging system for container walls to prevent leakage therethrough. This system includes a flexible nonelastic bag which is inserted in a folded condition partially through the hole to be plugged, with a substantially larger inner closed end than outer open end, and adapted to receive foamable material through said open end so as to expand as required to plug the hole.

DISCLOSURE OF THE INVENTION

A general object of the invention is to provide an improved method for repairing voids in finished urethane foam products, e.g., a vinyl skin covered automobile armrest or instrument panel.

Another object of the invention is to provide a method for repairing voids in a finished urethane foam product having a typical backing insert or retainer wall, the method including the steps of forming a hole through the retainer wall adjacent the void; inserting a small elastomeric sheath through the hole into the void; injecting a urethane or silicone elastomer into the sheath to fill same to conform to the void; and sealing off the hole with a suitable plug which may be sanded flush with the retainer wall outer surface.

These and other objects and advantages of the invention will become more apparent when reference is made to the following drawings and accompanying description.

BRIEF DESCRIPTION OF THE DRAWINGS

FIG. 1 is a flow chart generally diagramming the various steps involved in the subject void repair method;

FIG. 2 is a fragmentary cross-sectional view of a finished urethane foam product having a void therein; and FIG. 3-5 are fragmentary cross-sectional views similar to FIG. 2, and illustrating the steps of the inventive repair method for repairing the void appearing in FIG. 2.

BEST MODE OF CARRYING OUT THE INVENTION

Referring now to the drawings in greater detail, FIG. 1 is a flow chart generally diagramming the various steps of the void repairing method encompassed in FIGS. 2-5.

More specifically, FIG. 2 represents a finished urethane foam product 10, such as a vinyl skin covered armrest or instrument panel. Such a product 10 includes an exterior vinyl shell or skin 12 and an inner backing insert or retainer wall 14, with an intermediate foam layer 16. The latter may, at times, include a void 18 beneath the shell 12.

In order to repair the void 18, as illustrated in FIG. 3 an opening, such as countersunk hole 20, is formed through the retainer wall 14 into the foam layer 16. An elastomeric sheath 22, similar to a balloon or condom, is inserted through the hole 20 into the void 18.

As shown in FIG. 4, a urethane or high density silicone elastomer 24 is injected by any suitable means, such as a hypodermic syringe, into the sheath 22, wherein the elastomer expands to conform to the shape of the void 18.

Thereafter, the hole 20 is sealed off with any suitable type of plug 26, which is sanded flush with the retainer wall 14.

INDUSTRIAL APPLICABILITY

It should be apparent that the inventive method provides an improved means for repairing a void which may appear beneath the outer vinyl shell of a urethane foam product to thereby salvage the product, without any immediate or future detrimental effects in the product after its installation in the automobile interior.

While but one embodiment of the invention has been shown and described, other modifications thereof are possible within the scope of the following claims.

The embodiments of the invention in which an exclusive property or privilege is claimed are defined as follows:

1. A method for repairing voids in a finished urethane foam product having an outer shell, a backing retainer wall, and an intermediate urethane foam, the method comprising the steps of:
   a. forming an opening through the backing retainer wall into the intermediate urethane foam substantially adjacent a void in the urethane foam;
   b. inserting an elastomeric sheath through the opening into the void so that a majority of the sheath is positioned within the void;
   c. injecting an expandable material into the elastomeric sheath and allowing the material to expand to fill the sheath so that the sheath and the expanded material substantially conform to the void and thus fill the void; and d. sealing off the filled void and the formed opening by inserting a plug into the opening into contact with the filled void.

2. The method described in claim 1, wherein the opening is a counter-sunk hole.

3. The method as described in claim 1, wherein the expandable material is one of a urethane or silicone elastomer.

4. The method described in claim 1, comprising an additional step of sanding the plug flush with the retainer wall.

* * * * *